United States Patent
Long et al.

(10) Patent No.: US 10,040,360 B1
(45) Date of Patent: Aug. 7, 2018

(54) METHOD AND APPARATUS FOR THE ALIGNMENT OF VEHICLES PRIOR TO WIRELESS CHARGING INCLUDING A TRANSMISSION LINE THAT LEAKS A SIGNAL FOR ALIGNMENT

(71) Applicant: Momentum Dynamics Corporation, Malvern, PA (US)

(72) Inventors: Bruce Richard Long, Malvern, PA (US); Andrew William Daga, Malvern, PA (US)

(73) Assignee: Momentum Dynamics Corporation, Malvern, PA (US)

( * ) Notice: Subject to any disclaimer, the term of this patent is extended or adjusted under 35 U.S.C. 154(b) by 455 days.

(21) Appl. No.: 14/541,563

(22) Filed: Nov. 14, 2014

Related U.S. Application Data

(60) Provisional application No. 61/904,175, filed on Nov. 14, 2013.

(51) Int. Cl.
*B60L 11/18* (2006.01)
*H02J 7/02* (2016.01)
(Continued)

(52) U.S. Cl.
CPC ....... *B60L 11/1829* (2013.01); *B60L 11/1833* (2013.01); *H02J 7/025* (2013.01);
(Continued)

(58) Field of Classification Search
CPC B60L 11/1829; B60L 11/1833; B60L 11/182; H02J 7/025; H02J 7/0027; H02J 50/12; H02J 50/10; H02J 5/005; Y02T 90/122; Y02T 90/125; H04B 5/0081; H04B 5/0075
(Continued)

(56) References Cited

U.S. PATENT DOCUMENTS

| | | | | | |
|---|---|---|---|---|---|
| 4,219,821 A | * | 8/1980 | Selim | ........................ | G01S 3/16 342/445 |
| 9,882,416 B2 | * | 1/2018 | Amari | ..................... | H02J 7/025 |

(Continued)

*Primary Examiner* — Richard Isla Rodas
*Assistant Examiner* — Manuel Hernandez
(74) *Attorney, Agent, or Firm* — Schwegman Lundberg & Woessner, P.A.

(57) ABSTRACT

A vehicle alignment system is adapted to align a vehicle with a wireless power induction coil for wireless charging through use of magnetic resonant induction. The system includes a leaky transmission line disposed so as to align the vehicle left-right in a parking slot containing the wireless power induction coil when the vehicle is aligned for charging by the wireless power induction coil. At least two vehicle mounted antennas mounted on opposite sides of a left-right center line through the wireless power induction coil when the vehicle is aligned in the parking slot containing the wireless induction coil receive the operating frequency from the leaky transmission line, and signal processing circuitry detects a relative signal phase between signals induced by switching between antennas on opposite sides of the leaky transmission line. The relative phase differences between the detected signals from the antennas are representative of alignment of the vehicle with respect to the wireless power induction coil and the parking slot.

20 Claims, 5 Drawing Sheets

(51) Int. Cl.
  *H02J 50/10*   (2016.01)
  *H02J 50/12*   (2016.01)
  *H02J 5/00*   (2016.01)
  *H04B 5/00*   (2006.01)
  *H02J 7/00*   (2006.01)

(52) U.S. Cl.
  CPC .............. *H02J 50/10* (2016.02); *H02J 50/12* (2016.02); *H02J 5/005* (2013.01); *H02J 7/0027* (2013.01); *H04B 5/0075* (2013.01); *H04B 5/0081* (2013.01); *Y02T 90/122* (2013.01); *Y02T 90/125* (2013.01)

(58) Field of Classification Search
  USPC ......................................................... 320/108
  See application file for complete search history.

(56) References Cited

U.S. PATENT DOCUMENTS

| | | | | |
|---|---|---|---|---|
| 2011/0114401 | A1* | 5/2011 | Kanno | B60L 5/005 180/65.21 |
| 2013/0270921 | A1* | 10/2013 | Boys | H01F 38/14 307/104 |
| 2014/0125140 | A1* | 5/2014 | Widmer | H02J 7/025 307/104 |
| 2014/0183966 | A1* | 7/2014 | Suzuki | B60L 11/1831 307/104 |
| 2015/0094887 | A1* | 4/2015 | Kawashima | B60L 11/182 701/22 |
| 2015/0236513 | A1* | 8/2015 | Covic | H02J 5/005 307/104 |
| 2016/0025821 | A1* | 1/2016 | Widmer | G01R 33/0047 324/258 |
| 2017/0313202 | A1* | 11/2017 | Amari | B60L 11/1829 |

\* cited by examiner

METHOD AND APPARATUS FOR THE ALIGNMENT OF VEHICLES PRIOR TO WIRELESS CHARGING INCLUDING A TRANSMISSION LINE THAT LEAKS A SIGNAL FOR ALIGNMENT

CROSS-REFERENCE TO RELATED APPLICATIONS

This application claims the benefit of U.S. Provisional Application No. 61/904,175, filed Nov. 14, 2013, the disclosure of which is incorporated herein by reference in its entirety.

TECHNICAL FIELD

This patent application describes a vehicle alignment system as it pertains to wireless charging through use of magnetic resonant induction.

BACKGROUND

Resonant induction wireless charging makes use of an air core transformer consisting of two concentric coils displaced along a common coil axis. Transformer coupling coefficient and wireless power transfer efficiency is degraded if the primary and secondary coils are not axially aligned. For vehicle wireless charging this means some provision must be made so that the vehicle parking position is precise and repeatable in order to ensure coil axial alignment. The present invention is directed to such an apparatus and method.

SUMMARY

A vehicle alignment system in accordance with the invention aligns a vehicle with a wireless power induction coil for wireless charging through use of magnetic resonant induction. The system includes a leaky transmission line disposed so as to align the vehicle left-right in a parking slot containing the wireless power induction coil when the vehicle is aligned for charging by the wireless power induction coil. At least two vehicle mounted antennas mounted on respective sides of, and preferably symmetrically with respect to, a left-right center line through the wireless power induction coil receive the operating frequency from the leaky transmission line, and signal processing circuitry detects a relative signal phase between signals received by the antennas on opposite sides of the leaky transmission line. The relative phase differences between the detected signals from the antennas are representative of alignment of the vehicle with respect to the wireless power induction coil and the parking slot.

In exemplary embodiments, the leaky transmission line is disposed along a centerline of the parking slot or is parallel to but offset from a center line of the parking slot. The vehicle mounted antennas are offset, preferably symmetrically, from the center line through the wireless power source and, when the leaky transmission line is disposed along the center line of the parking slot, the vehicle mounted antennas are offset symmetrically from a centerline of the vehicle. The signal processing circuitry includes a frequency modulation receiver for detection of relative phase differences between the signals detected by the respective antennas as determined by vehicle parking slot alignment, where the phase differences are induced by sequential switching when the antennas are not an equal distance from the leaky transmission line. The signal processing circuitry may also include and antenna switch that switches between two or more vehicle mounted antennas. The signal processing circuitry may further include a synchronous detector responsive to antenna switching frequency components present in the output of the frequency modulation receiver, a voltage comparator that determines alignment error polarity from an output of the synchronous detector, and an absolute value circuit that determines alignment error magnitude from the output of the synchronous detector. The system may also include visible, audible, or tactile means for directing the driver to adjust the alignment of the vehicle in response to the alignment error polarity and the alignment error magnitude. In an exemplary embodiment, the operating frequency is the 40.68 MHz ISM frequency, although frequencies up to 61.5 MHz or more may be used depending upon the dimensions of the parking space and the spacing of the antennas on the vehicle.

The invention also includes a method for aligning a vehicle with a wireless power induction coil for wireless charging through use of magnetic resonant induction by aligning the vehicle left-right in a parking slot containing the wireless power induction coil for charging by the wireless power induction coil using a leaky transmission line and at least two vehicle mounted antennas mounted on opposite sides of a left-right center line through the wireless power induction coil when the vehicle is aligned in the parking slot containing the wireless power induction coil. The antennas are adapted to receive an operating frequency from the leaky transmission line and signal processing circuitry detects a relative signal phase between signals received by the antennas on opposite sides of the leaky transmission line. Alignment of the vehicle is adjusted relative to the wireless power induction coil based on relative phase differences between the detected signals from the antennas as representative of alignment of the vehicle with respect to the wireless power induction coil and the parking slot.

The method may also include switching between two or more vehicle mounted antennas and detecting relative phase differences between the signals detected by the respective antennas wherein the phase differences are induced by sequential switching when the antennas are not an equal distance from the leaky transmission line. The sequential switching includes a synchronous detector responsive to antenna switching frequency components present in the output of the frequency modulation receiver switching between the antennas, a voltage comparator determining alignment error polarity from an output of the synchronous detector, and an absolute value circuit determining alignment error magnitude from the output of the synchronous detector. The adjusting step may also comprise directing the driver to adjust the alignment of the vehicle in response to the alignment error polarity and the alignment error magnitude using visible, audible, or tactile means.

BRIEF DESCRIPTION OF THE DRAWINGS

The foregoing and other beneficial features and advantages of the invention will become apparent from the following detailed description in connection with the attached figures, of which.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and software for implementing such methods.

A detailed description of illustrative embodiments of the present invention will now be described with reference to FIGS. 1-5. Although this description provides a detailed example of possible implementations of the present invention, it should be noted that these details are intended to be exemplary and in no way delimit the scope of the invention.

Figure 1:
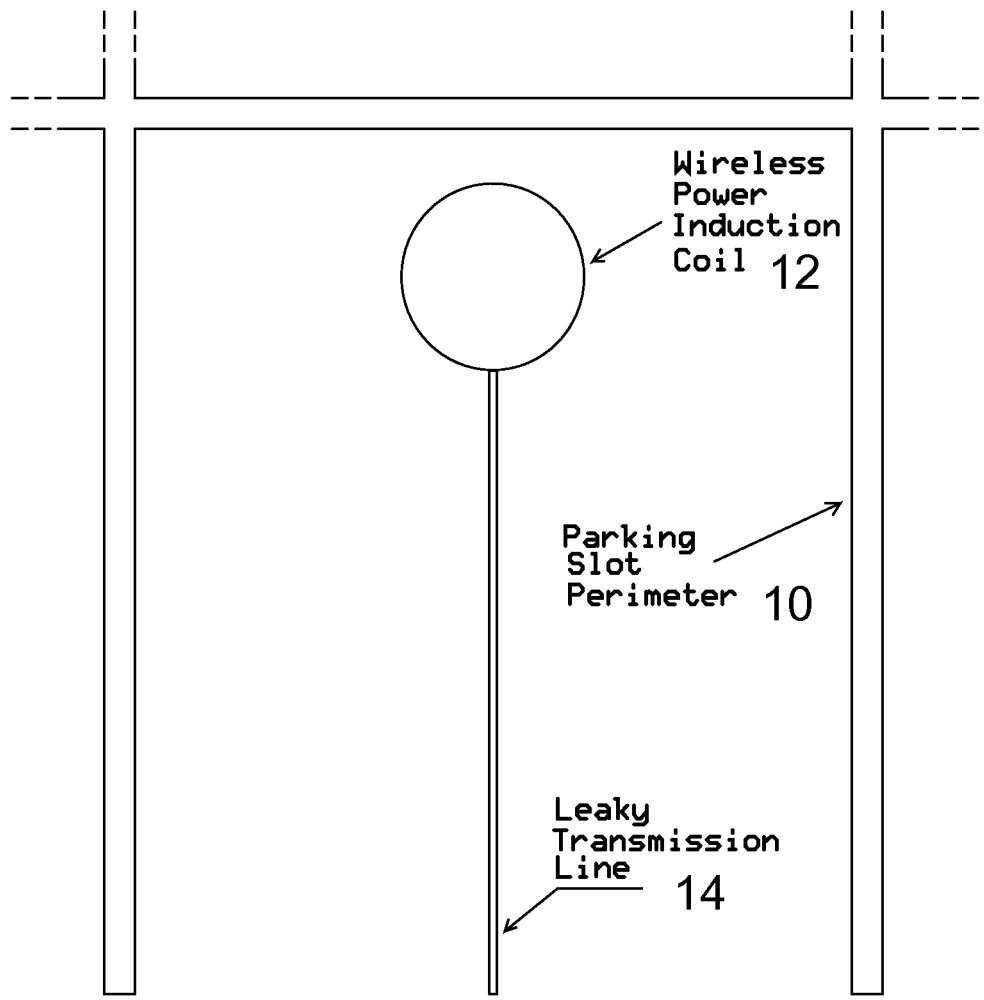
FIG. 1 shows a representation of a vehicle parking slot with an induction wireless power sending coil and an alignment system leaky transmission line coincident on the parking slot center line.

FIG. 1 is a schematic representation of an automotive parking slot 10. The wireless power transfer primary coil 12 is shown near the head of the parking slot 10, although the wireless power transfer primary coil 12 could also be located at the foot of the parking slot 10 or elsewhere within the parking slot boundaries. No matter what the primary coil location, the vehicle must be parked within the indicated boundaries of the parking slot 10. A buried or surface mounted leaky transmission line 14 extends along the parking slot centerline. This leaky transmission line 14, connected to a low power continuous wave radio frequency source (FIG. 2), creates a localized radio frequency field used by the vehicle mounted electronics to determine vehicle alignment within the perimeter of the parking slot 10.

Figure 2:
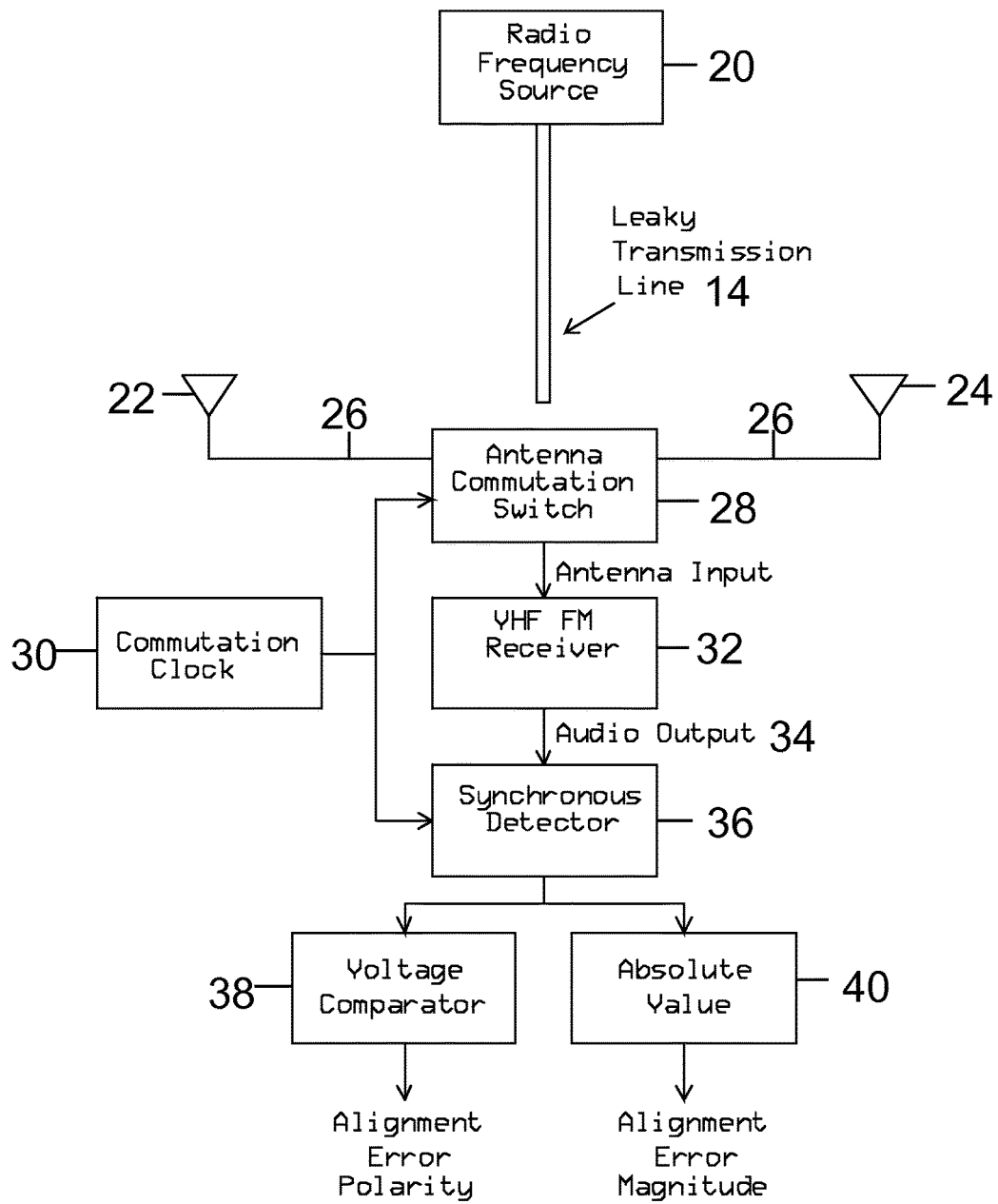
FIG. 2 shows a conceptual representation of the apparatus for vehicle parking alignment in accordance with the invention.

FIG. 2 is a block diagram representation of the alignment electronics. On the ground, there is a radio frequency source 20 and a length of leaky transmission line 14. On the vehicle, there are two small antennas 22, 24 mounted equal distant to the left and the right of the vehicle centerline. Those skilled in the art will appreciate that the antenna 22, 24 could also be offset (not equidistant) provided the offset is accounted for in the detected phase offset. The antennas are connected by coaxial cable 26 to an antenna switch 28. The antenna switch 28 is controlled by the antenna commutation clock 30 to alternately connect one then the other antenna 22, 24 to a conventional frequency modulation radio receiver 32. The commutation signal is a 50% duty cycle square wave.

When the two receiving antennas 22, 24 are placed equal distant from the leaky transmission line 14 as is the case when the vehicle is symmetrically aligned within the parking slot 10 perimeter, the commutating action of the antenna switch 28 has no effect upon the receiver signal. The amplitude and the phase of the two antenna signals are identical and there is no response from the receiver 32. However, if the vehicle is mis-aligned within the parking slot 10, the vehicle antennas 22, 24 are no longer symmetrical with respect to the leaky transmission line 14. The antenna switching action then introduces signal amplitude and phase perturbations at the commutation rate. The signal from the antenna closer to the leaky transmission line 14 will have larger amplitude and leading phase with respect to the more distant antenna. The frequency modulation receiver 32 ignores the amplitude perturbations but detects the phase perturbations, frequency being the time rate of change of phase, thereby replicating the antenna switch commutation signal in the receiver audio output 34. The receiver audio commutation signal replica is altered by the limited receiver bandwidth. If the commutating signal frequency is above the receiver recovered audio pass band, there is no recovered commutation signal. If the commutating signal frequency is just above the lower receiver audio pass band frequency, the recovered commutation signal will approximate the original commutation square wave albeit low pass filtered by the receiver upper audio pass band limit. A commutation signal frequency in the upper half of the receiver audio pass band leads to a largely sinusoidal recovered audio signal.

As further illustrated in FIG. 2, the audio output 34 is provided to synchronous detector 36 to detect the phase differences between the respective antenna signals, and output signals representative of any mis-alignments are provided to a voltage comparator 38 to determine alignment error polarity bases on which signal has a leading phase or lagging phase and to an absolute value detector 40 that determines the alignment error magnitude. In exemplary embodiments, the alignment error polarity and alignment error magnitude signals are provided to a display device and other audiovisual means to provide feedback to the driver for adjusting the vehicle in the parking slot 10 with respect to the wireless power induction coil 12.

The system maximum operating frequency provided by radio frequency source 20 is set by the separation between the two vehicle mounted antennas 22, 24 which must be less than the width of the vehicle. In the United States, the average parking slot width is about nine feet. Automobiles are typically no more than 8 feet wide. In order to avoid phase ambiguity, the two sensing antennas 22, 24 must be spaced no more than $\lambda/2$ apart at the operating frequency. For two sensing antennas separated by eight feet, the maximum system operating frequency is about 61.5 MHz. Higher frequencies and narrower antenna spacing is possible if the vehicle driver can be assumed to enter the parking slot with an initial alignment error less than ½ of the parking slot width. Higher operating frequencies are also possible with the use of more than two vehicle mounted antennas with the additional antenna or antennas used to resolve phase ambiguity. Those skilled in the art will appreciate that there is no lower limit on the system operating frequency except the signal to noise ratio of alignment error becomes progressively worse as the operating frequency is lowered.

The apparatus described herein provides for vehicle alignment left-right with respect to the parking slot centerline. Vehicle left-right mis-alignment is indicated to the driver by visible, audible or tactile means. A visual indication can be an illuminated indicator, a graphical display or software generated graphical overlay imposed upon a video camera image. An audible indication may be a continuous or pulsating sound or a software generated speech synthesizer.

Tactical indication can be provided by the vehicle steering wheel or steering mechanism, gear shift lever, the driver's seat or through the vehicle floor or through floor mounted vehicle control pedals. Driver visual cues or technical means described, for example, in U.S. Provisional Patent Application No. 61/862,572, filed Aug. 6, 2013, may be used to indicate and control where the aligned vehicle should stop for axial coil alignment in the front-back directions for assurance that the driver pulls far enough into the parking slot 10 to align the magnetic coils for charging.

Figure 3:
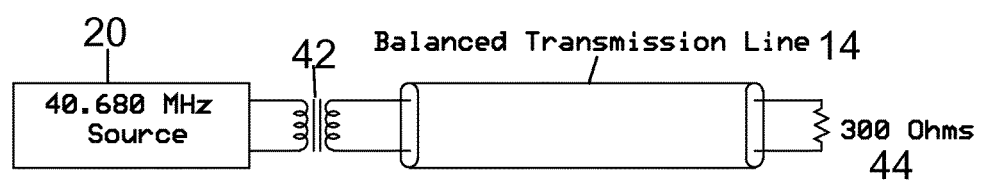
FIG. 3 shows an embodiment of the parking slot radio frequency source and leaky transmission line.
Figure 4:
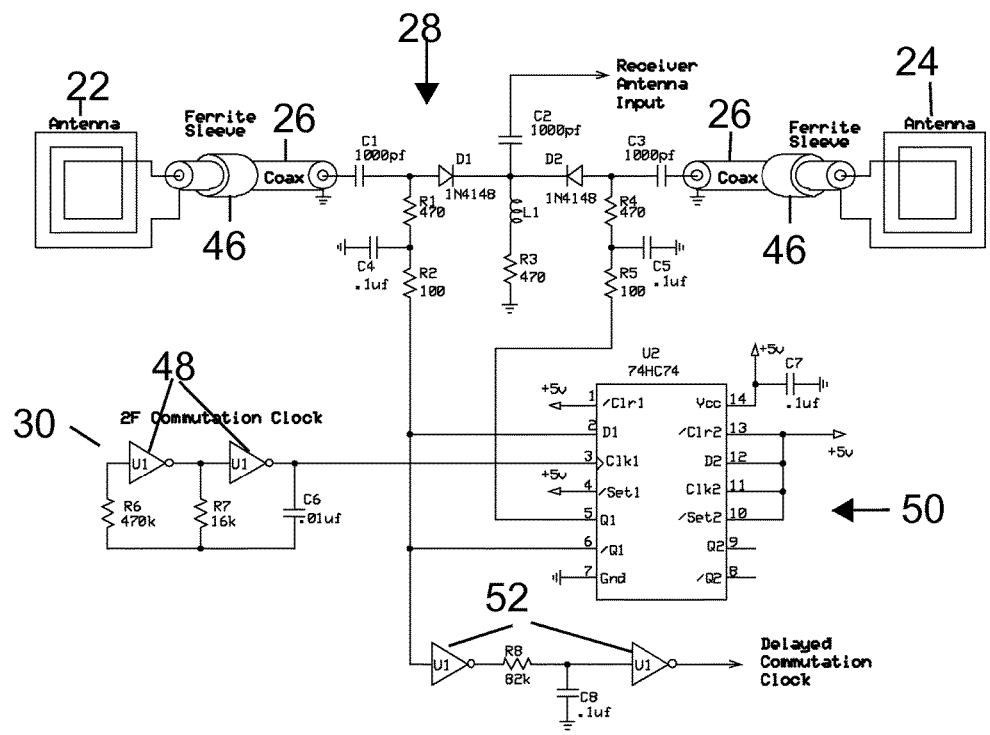
FIG. 4 shows an embodiment of the antenna commutation switch and associated circuitry.
Figure 5:
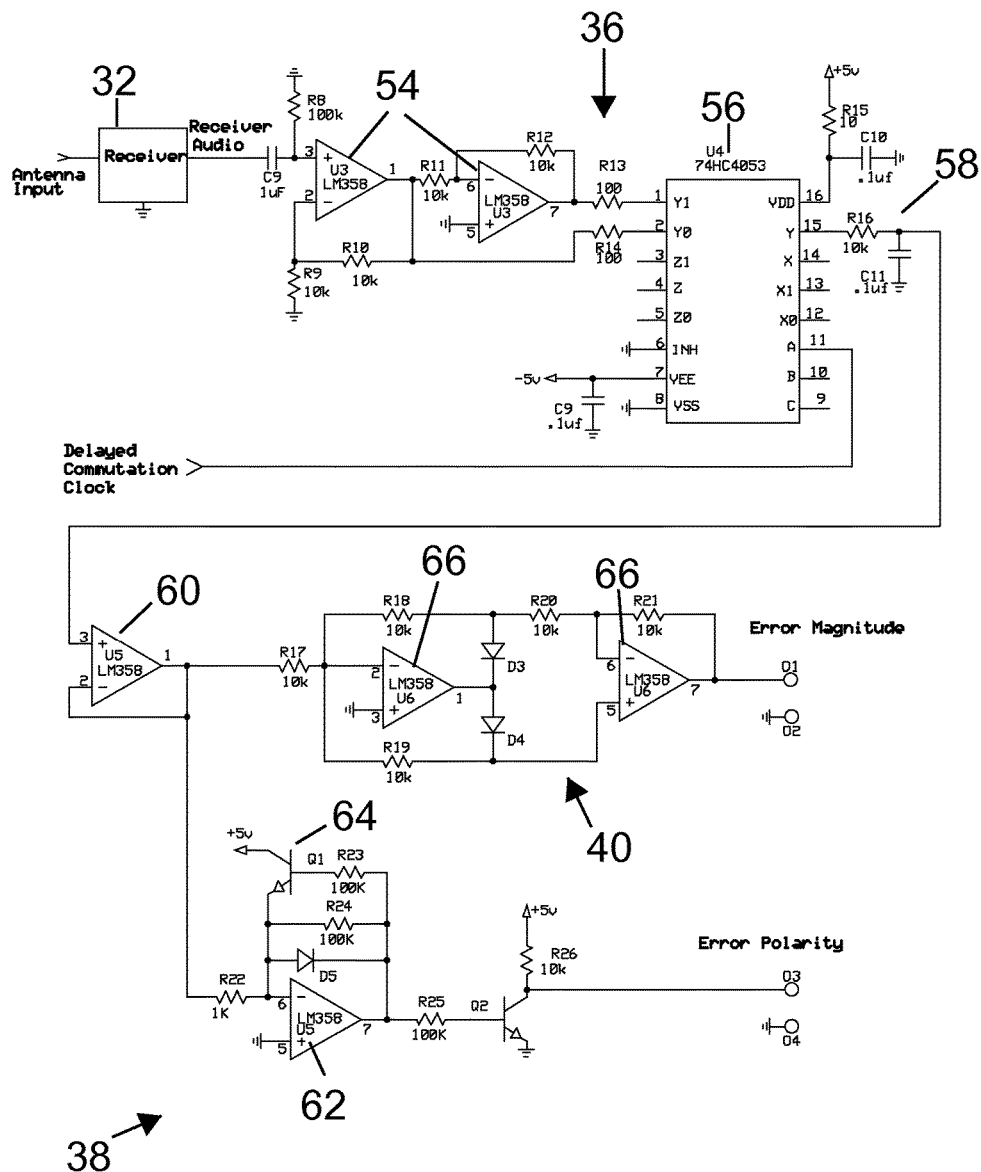
FIG. 5 shows an embodiment of the post FM receiver signal processing circuitry.

FIGS. 3-5 illustrate an exemplary embodiment of the leaky transmission line 14 of the invention. In particular, FIG. 3 shows the radio frequency source 20 and buried or surface mounted leaky transmission line 14 including a 40.68 MHz, fifty ohm impedance continuous wave radio frequency source 20 providing radio frequency excitation. A power level of about 1 mW is used. A mini-circuits RF transformer 42, model number ADT 4-6T is used as an impedance matching balun. The leaky transmission line 14 is implemented with a length of ordinary 300 ohm characteristic impedance balance transmission line. While this transmission line is not designed to be leaky, there is sufficient leakage to be usable in this application. A 300 ohm resistor 44 terminates the end of the balance line in order to eliminate reflections and standing waves. The transmission line does not have to be balanced; a leaky un-balanced coaxial line would be equally suitable.

FIG. 4 shows the circuitry associated with the antennas 22, 24, antenna commutating switch 28, and commutation clock 30 of FIG. 2. The antennas 22, 24 include ten turn rectangular spirals fabricated on a printed circuit board to ensure antenna-to-antenna consistency. The antennas 22, 24 are electrically small and are not resonant at the operating frequency. Each antenna 22, 24 is connected to a length of ordinary fifty ohm characteristic impedance coaxial cable 26. The two cables 26 are equal in length when the antennas are symmetrically spaced with respect to the centerline of the vehicle and each has a sleeve 46 including several ferrite beads slipped over the cable 26 at the ends connected to the antennas 22, 24 to serve as baluns and to suppress RF currents that would otherwise be induced on the cable outer conductors. Induced RF currents introduce significant system errors and must be suppressed. An operation frequency of 40.68 MHz is used in an exemplary embodiment. This frequency is near optimum for this application and is allocated nationally and internationally for ISM (Industrial, Scientific and Medical) uses which include RF heating, Doppler based frequency or phase sensitive motion and intrusion alarms, diathermy, cauterization and other non-communications uses. ISM frequencies are set aside for non-communications uses, but they can also be used for communications if the users are willing to accept the possibility of radio interference from the primary ISM applications. The advantage for doing so is significantly reduced equipment certification and spectrum allocation regulatory burdens. As the maximum range of the vehicle alignment system described herein is a few feet at most, the probability of radio interference from other 40.68 MHz ISM frequency users is quite remote.

An RC oscillator 30 comprised of two logic inverters 48, resistors R6 and R7 along with capacitor C6 generates a rectangular wave signal at twice the desired antenna commutation frequency which is then divided by 2 by a D flip-flop 50, thereby generating a commutation clock at the desired frequency with 50-50 duty cycle. Components R1, R3, R4, D1, D2, and L1 comprise a diode RF switch 28 controlled by the Q and not Q flip-flop outputs. R2, R5, C4, and C5 slow the leading and trailing edges of the switch control waveform thereby limiting switching transients. R8, C8 and associated logic inverters 52 delay the antenna commutation clock control signal to compensate for the receiver delay.

FIG. 5 shows the post receiver signal processing circuitry. The output of the antenna commutation switch 28 goes to the antenna input of a conventional narrowband FM receiver 32. The circuit includes a consumer grade pocket sized scanning receiver, a Uniden BC72XLY compact scanner, but any narrowband VHF FM receiver implantation, analog or digital, hardware or software is acceptable. Vehicle alignment error appears in the receiver audio output as a bandwidth limited square wave at the antenna commutation clock frequency. Square wave magnitude indicates alignment error magnitude; square wave polarity indicates alignment error direction, left or right. Synchronous detection then produces a DC voltage with amplitude proportional to alignment error and with polarity indicating alignment error direction.

The two op-amps 54 amplify the audio signal from the VHF FM receiver by gains of one and minus one. Integrated circuit 56 contains three single pole double throw (SPDT) CMOS FET switches one of which is used as a synchronous rectifier driven by the delayed antenna commutation switch control signal. A low pass filter 58 comprised of resistor R16 and capacitor C11 follows the SPDT switch 56 removing all commutation frequency ripples leaving a direct current signal with amplitude proportional to vehicle misalignment and polarity determined by the direction of the vehicle alignment error, left or right of the parking slot centerline. An absolute magnitude circuit recovers the magnitude of the vehicle displacement error while a voltage comparator determines the error polarity.

The two op-amps 60, 62 are used as a post RC low pass filter buffer amplifier and as a zero referenced voltage comparator, respectively. The components associated with transistor 64 keep the op-amp section out of voltage saturation thereby avoiding the subtle problems sometimes experienced when using op-amps in an open-loop connection as voltage comparators. The voltage comparator 38, implemented by op-amp 62, provides a logic level signal that indicates the polarity of the alignment error, left or right. Op-amps 66 and associated components comprise an absolute value detector 40 providing a unipolar representation of the alignment error magnitude independent of the polarity of the post synchronous detector signal.

In the implementation described above, the vehicle dual sense antennas 22, 24 and the leaky transmission line 14 are mounted along the vehicle centerline and parking slot center line, respectively. Offset locations as might be required to avoid vehicle underbody and parking slot obstacles can be accommodated by including the appropriate offset correction in the post synchronous detector hardware or software. In the latter situation, the required offset correction is provided by the ground to vehicle communications link.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described exemplary implementations.

What is claimed is:

1. A vehicle alignment system for aligning a vehicle with a wireless power induction coil in a parking slot for wireless charging through use of magnetic resonant induction, comprising:
   a transmission line disposed in the parking slot so as to align the vehicle left-right when the vehicle is aligned for charging by the wireless power induction coil, the transmission line leaking a signal having an operating frequency;
   at least two vehicle mounted antennas mounted on opposite sides of a left-right center line through the wireless power induction coil when the vehicle is aligned in the parking slot, said antennas detecting said signal having said operating frequency that leaks from the transmission line; and
   signal processing circuitry that detects a relative signal phase between signals detected by the antennas on opposite sides of the transmission line,
   wherein relative phase differences between the detected signals from the antennas are representative of alignment of the vehicle with respect to the wireless power induction coil and the parking slot.

2. A system as in claim 1, wherein the transmission line is disposed along a centerline of the parking slot.

3. A system as in claim 2, wherein the vehicle mounted antennas are offset symmetrically from a centerline of the vehicle.

4. A system as in claim 1, wherein the transmission line is parallel to but offset from a center line of the parking slot.

5. A system as in claim 1, wherein the operating frequency is below 61.5 MHz.

6. A system as in claim 5, wherein the operating frequency is the 40.68 MHz Industrial, Scientific and Medical frequency.

7. A system as in claim 1, wherein the signal processing circuitry includes an antenna switch that switches between two or more vehicle mounted antennas.

8. A system as in claim 1, further comprising a continuous wave radio frequency source that provides radio frequency excitation to the transmission line at a power level of about 1 mW.

9. A system as in claim 8, wherein the transmission line comprises a 300 ohm characteristic impedance transmission line.

10. A method for aligning a vehicle with a wireless power induction coil in a parking slot for wireless charging through use of magnetic resonant induction, comprising:
    aligning the vehicle left-right in the parking slot for charging by the wireless power induction coil, the parking slot containing a transmission line that leaks a signal having an operating frequency, and the aligning comprising at least two vehicle mounted antennas mounted on opposite sides of a left-right center line through the wireless power induction coil of the vehicle when the vehicle is aligned in the parking slot detecting said signal having said operating frequency that leaks from the transmission line;
    detecting a relative signal phase between signals detected by the antennas on opposite sides of the transmission line; and
    adjusting alignment of the vehicle relative to the wireless power induction coil based on relative phase differences between the detected signals from the antennas as representative of alignment of the vehicle with respect to the wireless power induction coil and the parking slot.

11. A method as in claim 10, comprising disposing the transmission line along a centerline of the parking slot.

12. A method as in claim 11, comprising offsetting the vehicle mounted antennas symmetrically from a centerline of the vehicle.

13. A method as in claim 10, comprising disposing the transmission line to be parallel to but offset from a center line of the parking slot.

14. A method as in claim 10, wherein the operating frequency is below 61.5 MHz.

15. A method as in claim 14, wherein the operating frequency is the 40.68 MHz Industrial, Scientific and Medical frequency.

16. A method as in claim 10, further comprising switching between two or more vehicle mounted antennas.

17. A vehicle alignment system for aligning a vehicle with a wireless power induction coil in a parking slot for wireless charging through use of magnetic resonant induction, comprising:
    a transmission line disposed in the parking slot so as to align the vehicle left-right when the vehicle is aligned for charging by the wireless power induction coil, the transmission line leaking a signal having an operating frequency;
    at least two vehicle mounted antennas mounted on opposite sides of a left-right center line through the wireless power induction coil when the vehicle is aligned in the parking slot, said antennas detecting said signal having said operating frequency that leaks from the transmission line; and
    signal processing circuitry that detects a relative signal phase between signals detected by the antennas on opposite sides of the transmission line, the signal processing circuitry comprising a frequency modulation receiver for detection of relative phase differences between the signals detected by the respective antennas, said phase differences induced by sequential switching when the antennas are not an equal distance from the transmission line, a synchronous detector responsive to antenna switching frequency components present in the output of said frequency modulation receiver, a voltage comparator that determines alignment error polarity from an output of said synchronous detector, and an absolute value circuit that determines alignment error magnitude from said output of said synchronous detector,
    wherein relative phase differences between the detected signals from the antennas are representative of alignment of the vehicle with respect to the wireless power induction coil and the parking slot.

18. A system as in claim 17, further comprising visible, audible, or tactile means for directing the driver to adjust the alignment of the vehicle in response to said alignment error polarity and said alignment error magnitude.

19. A method for aligning a vehicle with a wireless power induction coil in a parking slot for wireless charging through use of magnetic resonant induction, comprising:
    aligning the vehicle left-right in the parking slot for charging by the wireless power induction coil, the parking slot containing a transmission line that leaks a signal having an operating frequency, and the aligning comprising at least two vehicle mounted antennas mounted on opposite sides of a left-right center line through the wireless power induction coil of the vehicle when the vehicle is aligned in the parking slot detecting said signal having said operating frequency that leaks from the transmission line;

a frequency modulation receiver detecting a relative signal phase between signals detected by the antennas on opposite sides of the transmission line, said phase differences induced by sequential switching when the antennas are not an equal distance from the transmission line, wherein said sequential switching includes a synchronous detector responsive to antenna switching frequency components present in the output of said frequency modulation receiver switching between the antennas, a voltage comparator determining alignment error polarity from an output of said synchronous detector, and an absolute value circuit determining alignment error magnitude from said output of said synchronous detector; and adjusting alignment of the vehicle relative to the wireless power induction coil based on relative phase differences between the detected signals from the antennas as representative of alignment of the vehicle with respect to the wireless power induction coil and the parking slot.

20. A method as in claim 19, wherein said adjusting step comprises directing the driver to adjust the alignment of the vehicle in response to said alignment error polarity and said alignment error magnitude using visible, audible, or tactile means.

* * * * *